(12) United States Patent
Medra et al.

(10) Patent No.: US 12,451,848 B2
(45) Date of Patent: Oct. 21, 2025

(54) AMPLIFIER WITH LOW-GAIN ARCHITECTURE FOR MMWAVE RADIO FREQUENCY (RF) SIGNALS

(71) Applicant: QUALCOMM Incorporated, San Diego, CA (US)

(72) Inventors: Alaaeldien Mohamed Abdelrazek Medra, San Diego, CA (US); Xinmin Yu, San Diego, CA (US); Yunfei Feng, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 687 days.

(21) Appl. No.: 17/660,172

(22) Filed: Apr. 21, 2022

(65) Prior Publication Data

US 2023/0344390 A1  Oct. 26, 2023

(51) Int. Cl.
*H03F 3/19* (2006.01)
*H03G 3/30* (2006.01)
*H04B 1/04* (2006.01)

(52) U.S. Cl.
CPC .............. *H03F 3/19* (2013.01); *H03G 3/3036* (2013.01); *H04B 1/04* (2013.01); *H03F 2200/294* (2013.01); *H03F 2200/451* (2013.01); *H03G 2201/103* (2013.01); *H03G 2201/307* (2013.01)

(58) Field of Classification Search
CPC ................. H03F 3/19; H03F 2200/294; H03F 2200/451; H03G 3/3036; H03G 2201/307; H04B 1/04
See application file for complete search history.

(56) References Cited

U.S. PATENT DOCUMENTS

| 8,891,697 B2 * | 11/2014 | Kobayashi | H03F 3/45748 |
| | | | 375/345 |
| 10,320,350 B1 | 6/2019 | Leitner et al. | |
| 2005/0068099 A1 * | 3/2005 | Floyd | H03F 1/223 |
| | | | 330/51 |
| 2016/0192295 A1 | 6/2016 | Son et al. | |
| 2020/0059210 A1 * | 2/2020 | Cho | H03F 3/19 |
| 2021/0218373 A1 | 7/2021 | Jain et al. | |

FOREIGN PATENT DOCUMENTS

WO    WO-9930426 A1    6/1999

OTHER PUBLICATIONS

JP 2019149684 A), Koya, self-dianosis device, Sep. 2019, pp. 1-10 (Year: 2019).*

(Continued)

*Primary Examiner* — Keith Ferguson
(74) *Attorney, Agent, or Firm* — Norton Rose Fulbright LLP

(57) ABSTRACT

This disclosure provides systems, methods, and devices for wireless communication that support low noise amplification of mmWave radio frequency (RF) signals. In a first aspect, a low noise amplifier includes a first stage amplifier; a second stage amplifier; a configurable first stage bypass coupled between a first input and a first output of the first stage amplifier; and a configurable second stage bypass coupled between a second input and a second output of the second stage amplifier. Other aspects and features are also claimed and described.

27 Claims, 9 Drawing Sheets

(56) References Cited

OTHER PUBLICATIONS

International Search Report and Written Opinion—PCT/US2023/064857—ISA/EPO—Jul. 13, 2023.
Sun Z., et al., "A 0.85mm2 BLE Transceiver Using an On-Chip Harmonic-Suppressed RFIO Circuitry With T/R Switch", IEEE Transactions on Circuits and Systems I, Regular Papers, IEEE, US, vol. 68, No. 1, Nov. 6, 2020, (Jan. 2021), XP011830192, pp. 196-209, p. 196, Left-Hand col. Line 25—p. 206, Right-Hand col. Line 23, Figures 1-26.

* cited by examiner

AMPLIFIER WITH LOW-GAIN ARCHITECTURE FOR MMWAVE RADIO FREQUENCY (RF) SIGNALS

TECHNICAL FIELD

Aspects of the present disclosure relate generally to wireless communication systems, and more particularly, to radio frequency (RF) processing circuitry for wireless communication systems. Some features may enable and provide improved communications, including improved operation of RF transceivers, such as in low gain mode for processing millimeter-wave (mmWave) RF signals.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipment (UE). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UE communicating with the neighbor base stations or from other wireless RF transmitters. This interference may degrade performance on both the downlink and uplink.

As the demand for mobile broadband access continues to increase, the possibilities of interference and congested networks grows with more UE accessing the long-range wireless communication networks and more short-range wireless systems being deployed in communities. Research and development continue to advance wireless technologies not only to meet the growing demand for mobile broadband access, but to advance and enhance the user experience with mobile communications.

Communicating at higher frequencies has been part of the research and development efforts. Higher frequencies provide the potential for higher bandwidth, and thus better user experiences with wireless devices. Additionally, higher frequency spectrum is less used than lower frequency spectrum, and thus there are fewer potential interference sources. Fewer interference sources reduce the likelihood of losing data in transmission and requiring retransmission of the lost data. Such interference reduces the user experience by causing delays in loading content and/or causing stuttering in real-time applications such as video and audio broadcasts and telephone calls.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Recently millimeter wave (mmWave) frequencies have been considered for expanding wireless communications spectrum. mmWave frequencies refer to frequencies that have a wavelength of approximately 1-10 millimeters, which correspond to frequencies between approximately 30-300 GHz. Higher frequency RF signals, such as mmWave RF signals, are more difficult to process in integrated circuits. RF signals may be amplified in an integrated circuit to improve signal strength, particularly for RF signals received over an antenna. Depending on environmental conditions, different levels of amplification may be desired to obtain a signal for further processing that is within a specific signal level range. For example, processing of an RF signal may be performed in an integrated circuit designed to process signals in a desired signal level range. When the RF signal is received through an antenna a long distance from the source, the signal level may be under the desired signal level range. When the RF signal is received through an antenna a short distance from the source, the signal level may be over the desired signal level range. An amplifier in an integrated circuit operates on RF signals to adjust the signal level toward the desired signal level range.

Amplifier design is challenged by a desire to operate at low power consumption and across a wide range of frequencies and signal strengths. Further, amplifiers operation is desired to be consistent across these different operating conditions of different signal strengths and frequencies, measured by a merit referred to a linearity. High linearity results in an amplifier being consistent regardless of the signal strength and frequency, and thus improves the operations for signal processing. Low linearity can lead to undesirable and unexpected results due to a reduced quality of the signal in certain signal strengths and frequencies. The challenges of high linearity and low power consumption are compounded when operating at higher frequency ranges, such as when processing mmWave RF signals.

A conventional amplifier achieves improved linearity by operating at higher current levels even in low gain modes. Attenuation may be added at the input to reduce the signal strength in such conventional amplifiers. The attenuation results in a degradation in the noise figure (NF) of the amplifier, which is undesirable. Further, the higher current levels are undesirable, particularly for mobile devices, which have limited battery capacity.

According to aspects of this disclosure, an amplifier with low-gain modes of operation may include multiple stages of amplification with configurable bypasses around one or more of the amplifier stages. Components, such as switches and capacitors, may be included within the bypass paths for the amplifier stages in a way such that capacitances created by the bypass paths have a reduced or negligible impact on high gain modes. Each amplifier stage may be bypassed individually (e.g., selectively) based on which lower gain mode is used and/or a desired linearity at the time. In some embodiments, amplifiers according to aspects of the disclosure may be implemented in a low noise amplifier (LNA) for processing high-frequency signals such as mmWave RF signals.

In one aspect of the disclosure, an apparatus includes an N-stage amplifier including at least a first stage amplifier and a second stage amplifier. The N-stage amplifier also includes at least one of: a configurable first stage bypass coupled between a first input and a first output of the first stage amplifier; and a configurable second stage bypass coupled between a second input and a second output of the second stage amplifier.

In one aspect of the disclosure, a method for wireless communication includes determining a radio frequency (RF) amplifier gain setting; and configuring a radio frequency (RF) amplifier based on the radio frequency (RF) amplifier gain setting by performing operations of controlling a configurable first stage bypass of a first stage amplifier of the radio frequency (RF) amplifier; and controlling a configurable second stage bypass of a second stage amplifier of the radio frequency (RF) amplifier.

In an additional aspect of the disclosure, an apparatus includes at least one processor and a memory coupled to the at least one processor. The at least one processor is configured to perform operations of determining a radio frequency (RF) amplifier gain setting; and configuring a radio frequency (RF) amplifier based on the radio frequency (RF) amplifier gain setting. Configuring the RF amplifier may include performing operations of controlling a configurable first stage bypass of a first stage amplifier of the radio frequency (RF) amplifier; and controlling a configurable second stage bypass of a second stage amplifier of the radio frequency (RF) amplifier.

In an additional aspect of the disclosure, an apparatus includes means for determining a radio frequency (RF) amplifier gain setting; and means for configuring a radio frequency (RF) amplifier based on the radio frequency (RF) amplifier gain setting. The configuring means may include means for controlling a configurable first stage bypass of a first stage amplifier of the radio frequency (RF) amplifier; and means for controlling a configurable second stage bypass of a second stage amplifier of the radio frequency (RF) amplifier.

In an additional aspect of the disclosure, a non-transitory computer-readable medium stores instructions that, when executed by a processor, cause the processor to perform operations. The operations include determining a radio frequency (RF) amplifier gain setting; and configuring a radio frequency (RF) amplifier based on the radio frequency (RF) amplifier gain setting. Configuring the RF amplifier may include performing operations of controlling a configurable first stage bypass of a first stage amplifier of the radio frequency (RF) amplifier; and controlling a configurable second stage bypass of a second stage amplifier of the radio frequency (RF) amplifier.

In an additional aspect of the disclosure, an apparatus includes: a radio frequency (RF) low noise amplifier (LNA) comprising an amplifier input and an amplifier output, the RF LNA including: a first gain transistor comprising a first input and a first output, wherein the first input is coupled to the amplifier input; a first bypass transistor comprising a second input and a second output, wherein the second input is coupled to the amplifier input and the second output is coupled to the first output; a second gain transistor comprising a third input and a third output, wherein the third input is coupled to the second output and the third output is coupled to the amplifier output; and a second bypass transistor comprising a fourth input and a fourth output, wherein the fourth input is coupled to the third input and the fourth output is coupled to the amplifier output.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
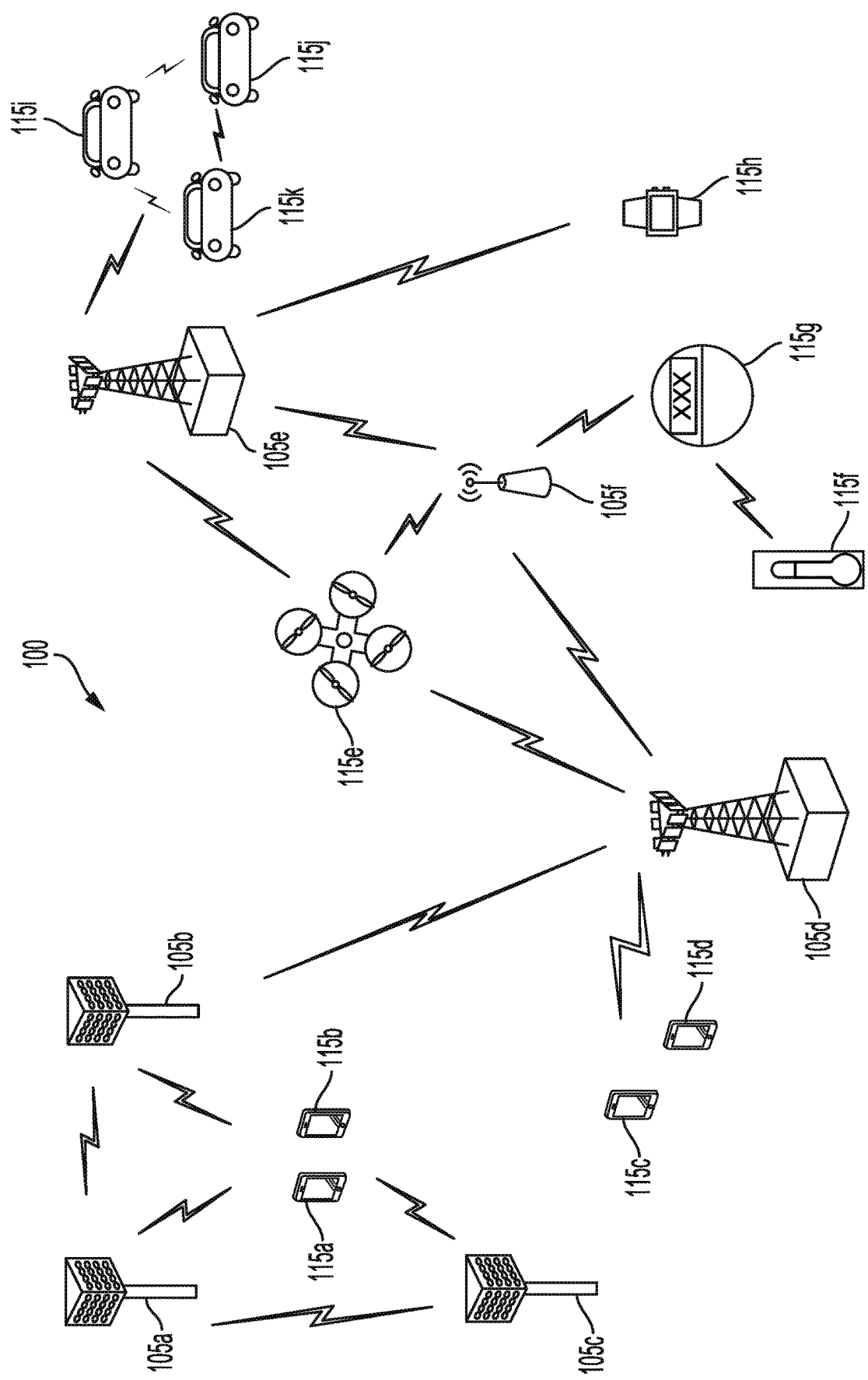
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support RF amplifier configuration, including reconfiguration of bypass paths around stages of the amplifier and reconfiguration of a common gate configuration of stages of the amplifier. The RF amplifier may be implemented using a common gate configuration, which provides a lower input impedance and better linearity. In some embodiments, the amplifier does not use input attenuation that would degrade the noise figure of the RF amplifier.

Particular implementations of the subject matter described in this disclosure may be implemented to realize one or more of the following potential advantages or benefits. In some aspects, the present disclosure provides techniques for amplifying high-frequency RF signals, such as mmWave RF signals, with improved noise figures and reduced power consumption. These benefits are particularly advantageous in mobile devices operating in noisy, uncontrolled environments, from limited power sources, such as batteries.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipment (UE). A mobile phone operator's network may comprise one or more GERANs, which may be coupled with UTRANs in the case of a UMTS/GSM network. Additionally, an operator network may also include one or more LTE networks, or one or more other networks. The various network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long-term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UE with service subscriptions with the network provider. A small cell, such as a pico cell, would generally cover a relatively smaller geographic area and may allow unrestricted access by UE with service subscriptions with the network provider. A small cell, such as a femto cell, would also generally cover a relatively small geographic area (e.g., a home) and, in addition to unrestricted access, may also provide restricted access by UE having an association with the femto cell (e.g., UE in a closed subscriber group (CSG), UE for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UE 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UE 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UE that does not include UICCs may also be referred to as IoE devices. UEs 115a-115d of the implementation illustrated in FIG. 1 are examples of mobile smart phone-type devices accessing wireless network 100. A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
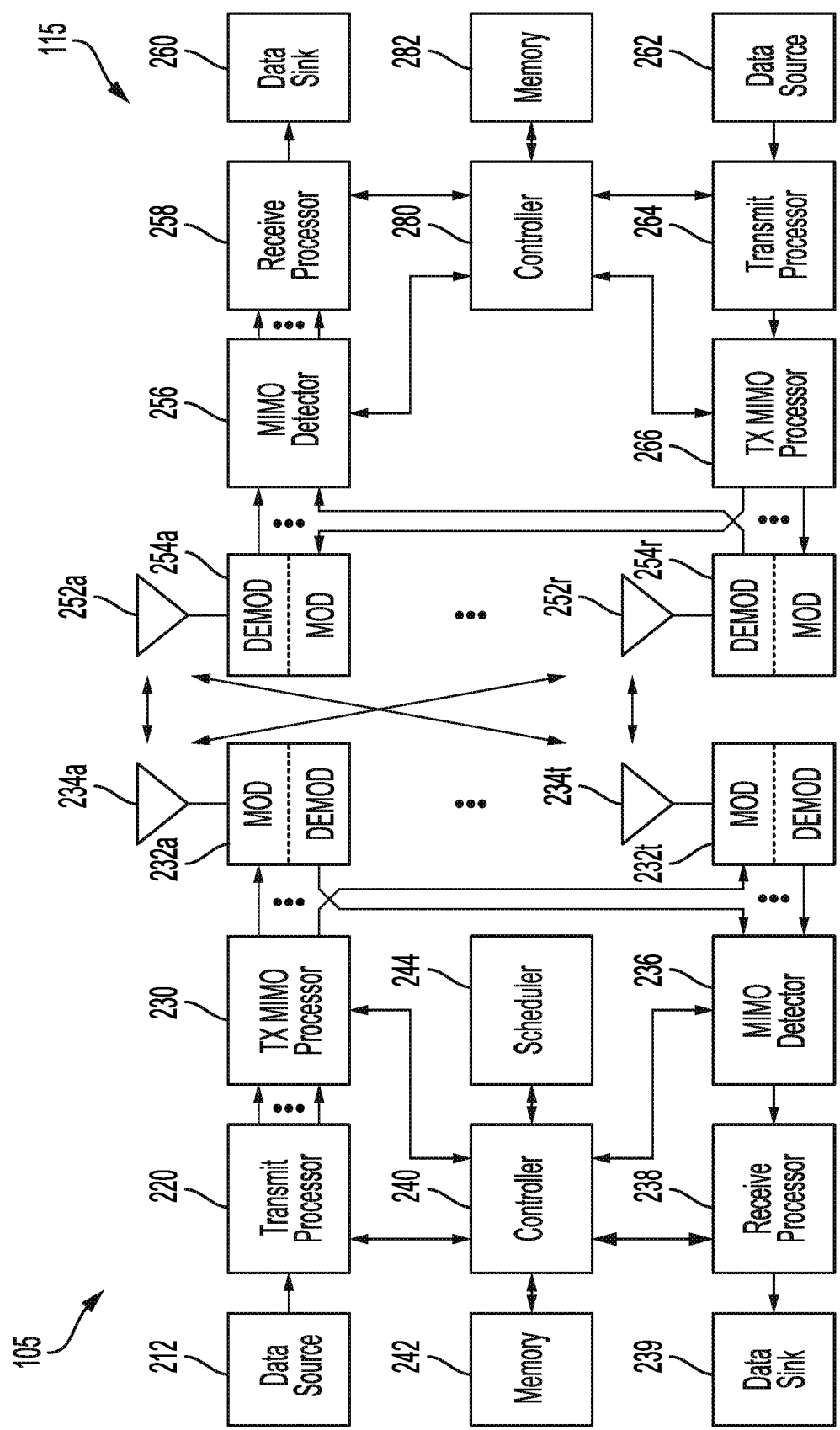
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIG. 5 or FIG. 6, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3A:
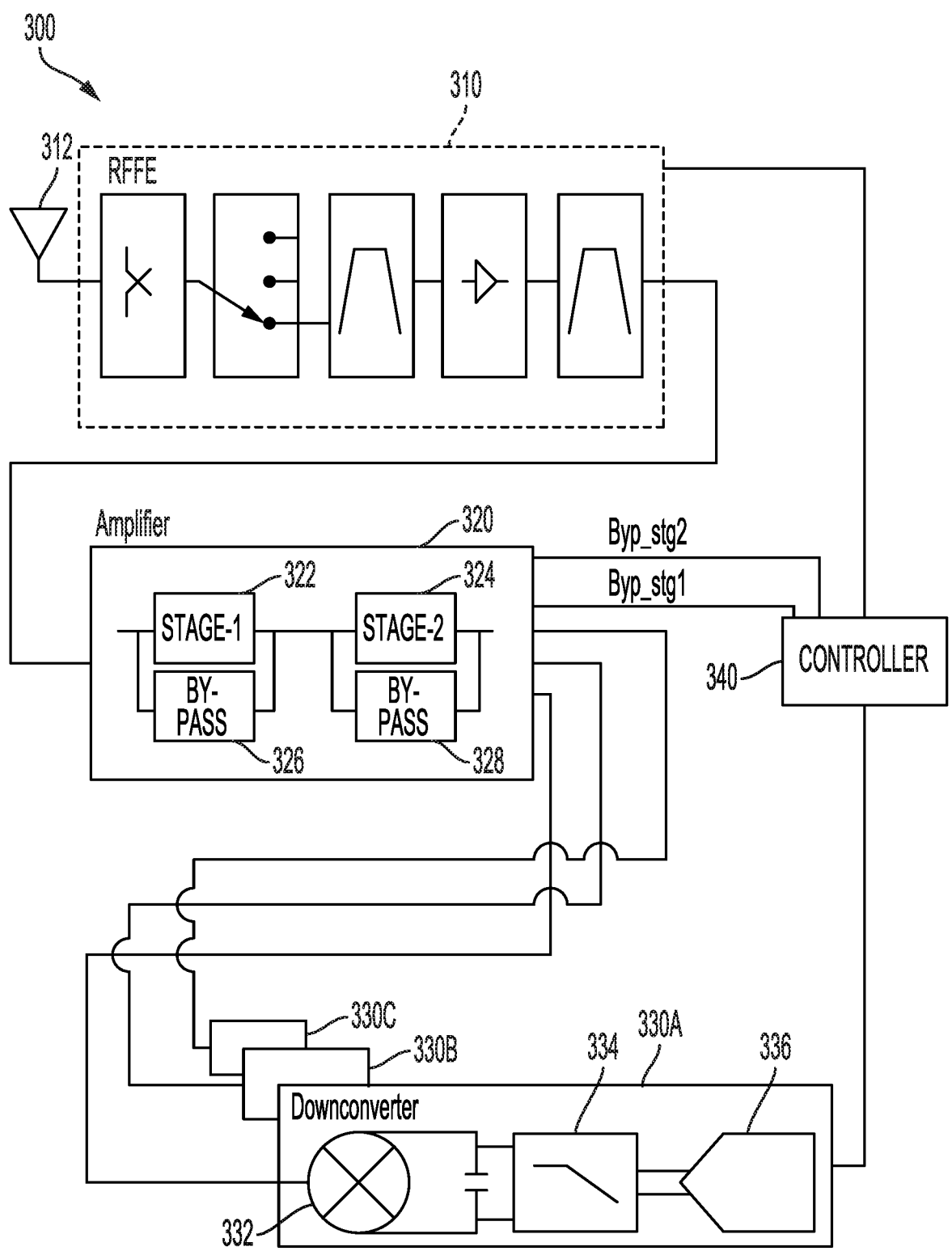
FIG. 3A is a block diagram illustrating a radio frequency (RF) transceiver according to one or more aspects.

FIG. 3A is a block diagram illustrating a wireless receiver circuit 300 according to one or more aspects. In some embodiments, the receiver circuit 300 may be part of a mmWave radio frequency (RF) transceiver or a converged sub-6 Ghz and mmWave radio frequency (RF) transceiver, or another transceiver type. In some embodiments, some or all of the components in FIG. 3A may be part of a single integrated circuit (IC) sharing a common substrate. The receiver circuit 300 may include an antenna 312 to receive radio frequency (RF) signals, including sub-6 GHz, mmWave RF signals, and/or other RF signals (such as for WLAN and/or GPS signals). The antenna 312 is coupled to a RF front-end (RFFE) 310, which may include duplexers, SAW filters, switches, and/or LNAs. The RFFE 310 is coupled to an amplifier 320, such as a low noise amplifier (LNA). The amplifier 320 is coupled to one or more downconverters 330A, 330B, and 330C. Each of the downconverters 330A, 330B, and 330C may include mixers 332, baseband filters (BBFs) 334, and/or analog-to-digital converters (ADCs) 336. In a homodyne configuration, the downconverters 330A-C may convert mmWave RF signals to baseband for processing. In a heterodyne configuration, additional downconverters (not shown) may convert the mmWave RF signals to mmWave IF signals for further processing in downconverters 330A-C for conversion to baseband. Amplification of RF signals as described according to embodiments of this disclosure, such as by using local bypass paths, may be performed on the mmWave RF signals before downconversion to mmWave IF signals or on the mmWave IF signals. In some embodiments, the amplifier 320 is shared on an IC with one or more of the RFFE 310 and/or the downconverters 330A, 330B, and 330C.

The amplifier 320 may include multiple stages, such as two or more stages. RF signals from the RFFE 310 are processed through a first stage amplifier 322 and/or a second stage amplifier 324, before output to one or more of the downconverters 330A-C. In some embodiments, the first stage amplifier 322 and/or the second stage amplifier 324 is single-ended. Each of the first stage amplifier 322 and the second stage amplifier 324 may be coupled to a configurable first and second stage bypass 326 and 328, respectively. The configurable first and second stage bypass 326 and 328 allow RF signals to pass around, rather than through, gain elements, such as transistors, of the first stage amplifier 322 and/or the second stage amplifier 324. Bypassing the gain elements of the amplifier stages 322 and 324 allow configuration of the gain provided by amplifier 320 according to a desired gain mode. Further, bypassing the amplifier stages 322 and 324 may allow reducing power consumption by disabling the amplifier stages 322 and 324. The configurable stage bypass 326 and 328 may be local to the amplifier stages 322 and 324 to reduce the signal path distance for the RF signals in the receiver circuit 300, which reduces matching issues. For example, the bypass paths created by stage bypass 326 and 328 may be limited to a path within amplifier 320 or limited to a path between stage boundaries of the amplifier stages 322 and 324. For example, the amplifier stages 322 and 324 may be separated by transformers, and the bypass paths created by stage bypass 326 and 328 may be limited to one side of the transformer. A phase-shifter may be coupled to an output of the amplifier 320 and configured to adjust a signal phase of the amplified mmWave RF signals.

A controller 340 may be coupled to the amplifier 320, the RFFE 310, and/or the downconverters 330A-C. The controller 340 may execute operations to control operation of the receiver circuit 300. For example, the controller 340 may determine a gain mode for the amplifier 320, and configure the first stage amplifier 322, the second stage amplifier 324, the configurable first stage bypass 326, and/or the configurable second stage bypass 328 based on the determined gain mode. The controller 340 may determine the gain mode based on measurements of signals received at the antenna 312, measurements of signals within the RFFE 310, measurements of signals in the downconverters 330A-C, information generated as part of a channel quality indicator (CQI) report, information received from another wireless device (such as a base station), and/or information regarding a current configuration of the wireless receiver 300. In some embodiments, the controller 340 may configure the amplifier 320 and/or other components of the wireless receiver 300 for operation in one of six gain modes (e.g., G1, G2, G3, G4, G5, and G6). The gain modes may include positive gain (e.g., amplification) and negative gain (e.g., attenuation) modes, such as when G1, G2, and G3 are positive gain modes, G4 is a zero-gain mode, and G5 and G6 are negative gain modes.

Figure 3B:
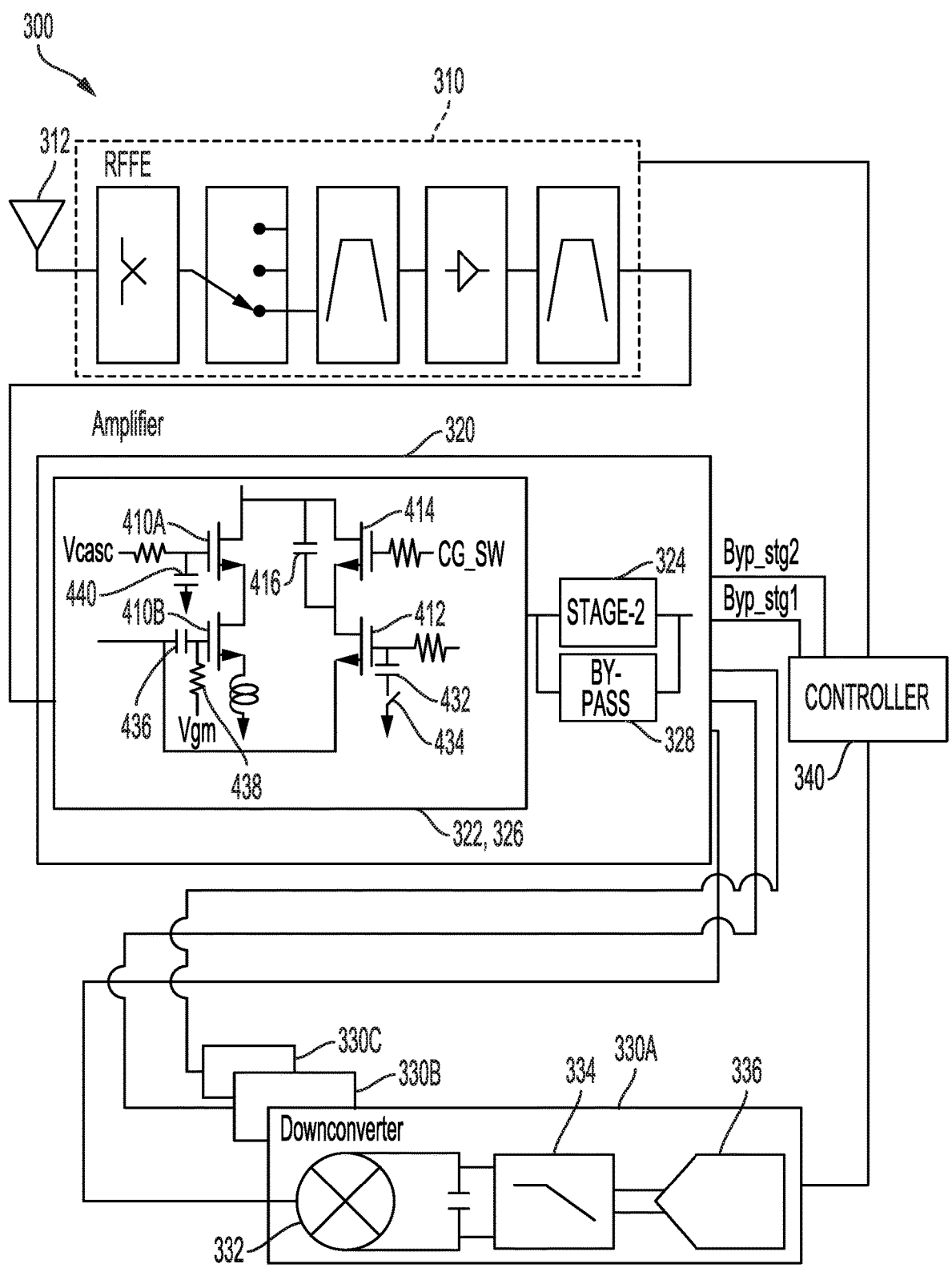
FIG. 3B is a block diagram illustrating a radio frequency (RF) transceiver according to one or more aspects.
Figure 4:
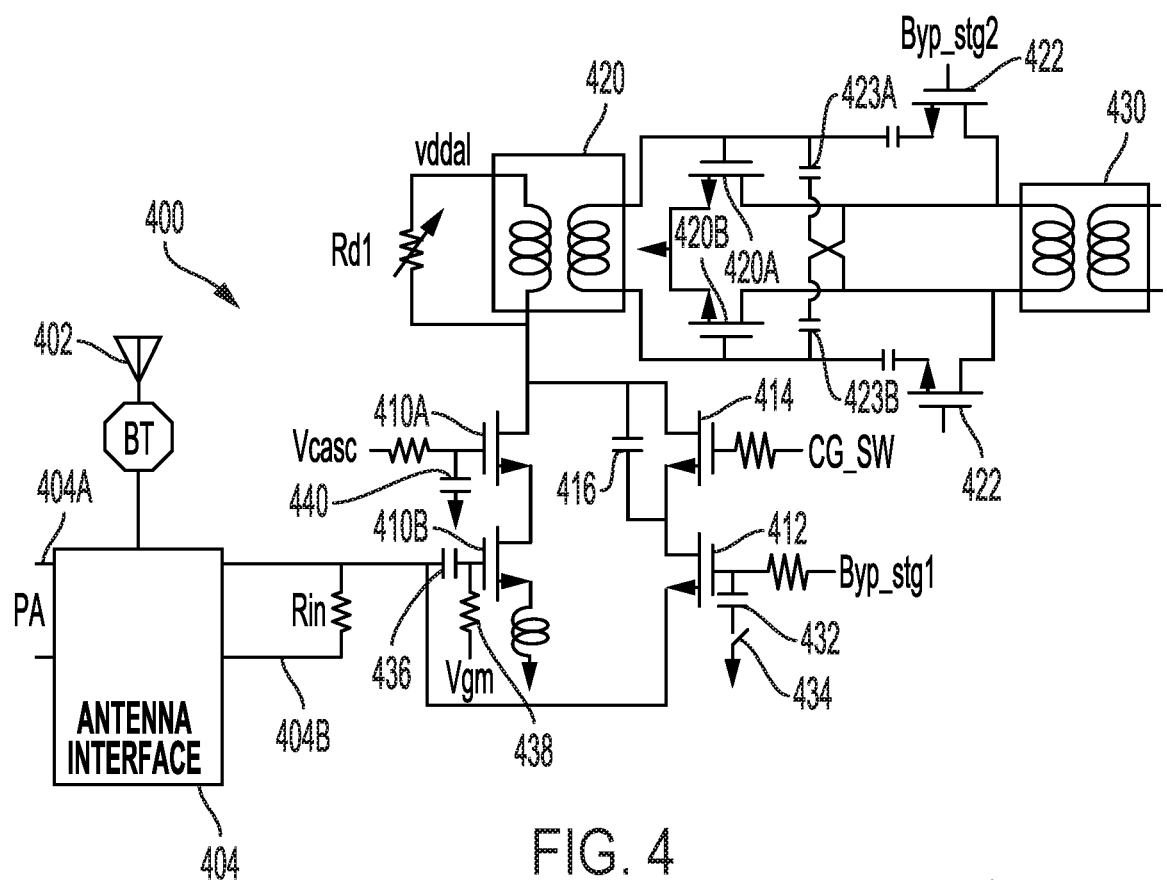
FIG. 4 is a circuit diagram illustrating an amplifier for RF signals with configurable local bypass paths according to some embodiments of the disclosure.
Figure 5:
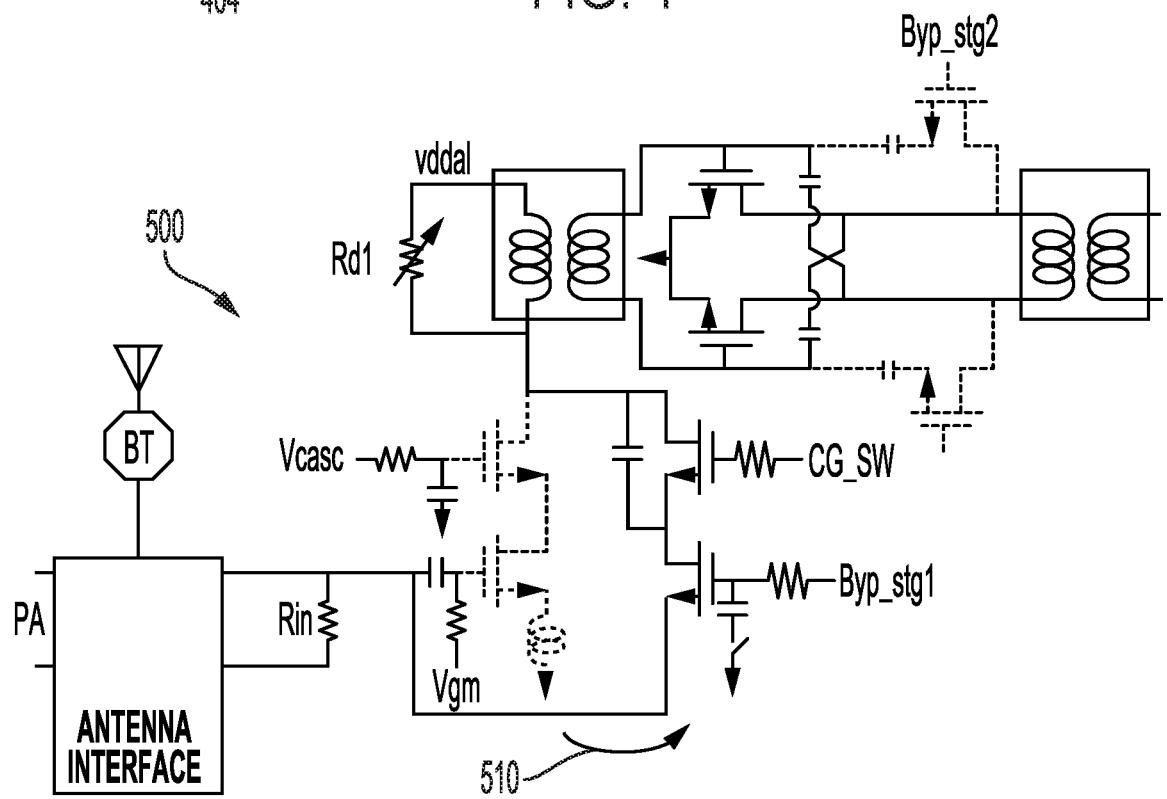
FIG. 5 is a circuit illustrating operation of a two-stage amplifier in a first gain mode according to some embodiments of the disclosure.
Figure 6:
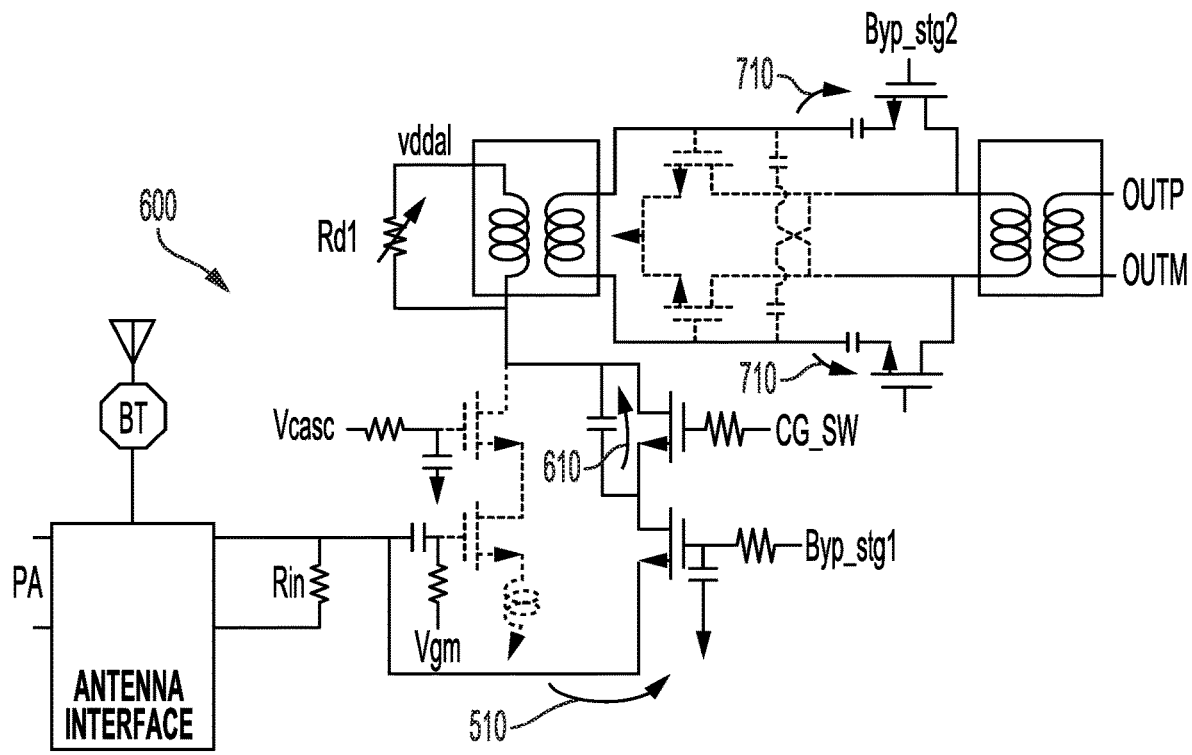
FIG. 6 is a circuit illustrating operation of a two-stage amplifier in a second gain mode according to some embodiments of the disclosure.
Figure 7:
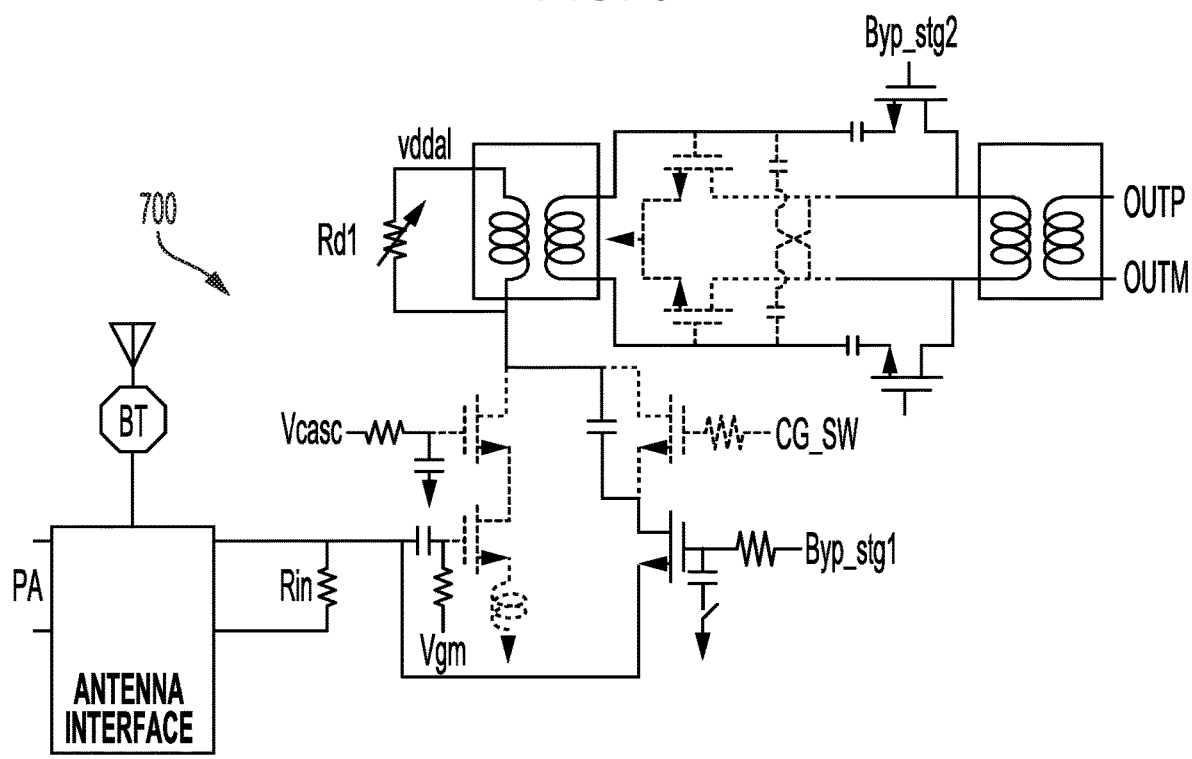
FIG. 7 is a circuit illustrating operation of a two-stage amplifier in a third gain mode according to some embodiments of the disclosure.
Figure 8:
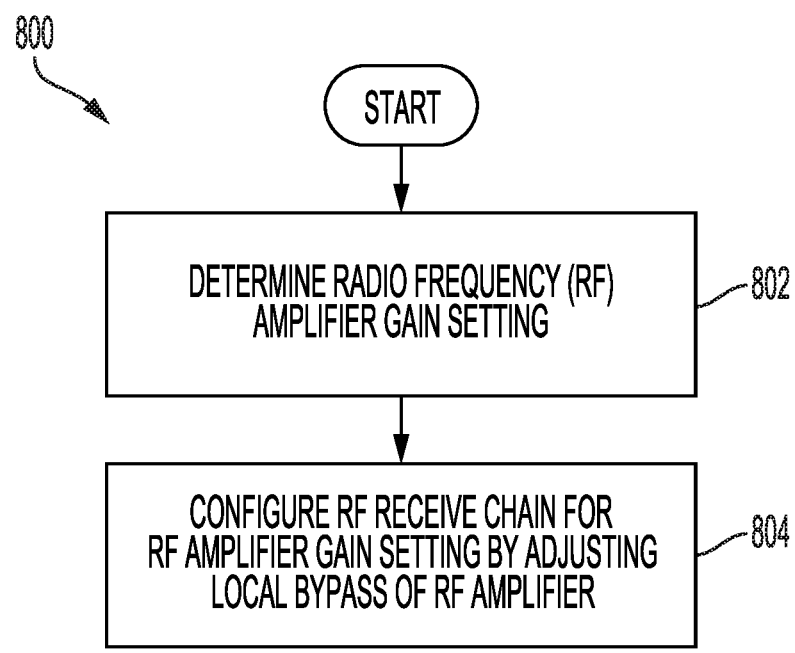
FIG. 8 is a flow chart illustrating a method of operating an amplifier in a receiver circuit according to some embodiments of the disclosure.

As described with reference to FIG. 3A, the present disclosure provides techniques for operating an amplifier, such as a low noise amplifier (LNA), for mmWave RF signal processing with low-gain circuitry. The LNA may include multiple stages, and each stage may include a bypass path. As will be described in further detail with reference to the embodiments of FIG. 4, FIG. 5, FIG. 6, FIG. 7, and FIG. 8, switches and capacitors may be included within the bypass paths for each stage in a way such that capacitances created by bypass paths have little or no impact on high-gain modes for the amplifier 320. Each stage can be bypassed individually (e.g., selectively) based on which gain mode is used and/or linearity requirements that may need to be satisfied at the time. One embodiment for a two-stage amplifier is shown in FIG. 4, and another embodiment for a two-stage amplifier is shown in FIG. 8. FIG. 5, FIG. 6, and FIG. 7 illustrate various operating modes for the two-stage amplifier of FIG. 4. For example, in one embodiment, a first-stage amplifier with bypass and common gate configuration capability as shown in FIG. 4 is used as the first stage of an LNA in a system such as that of FIG. 3A. Such a system, with an LNA, is shown in FIG. 3B. FIG. 3B is a block diagram illustrating a radio frequency (RF) transceiver according to one or more aspects. In FIG. 3B, the first stage amplifier with local bypass comprising an amplifier gain, a bypass transistor, and a common gate (CG) transistor, is shown in block 322, 326. Various LNA topologies with bypass networks for the second stage may be coupled to the first stage circuitry shown in FIG. 3B. The second stage circuitry may be the same or different than any particular topologies described for the second stage with respect to FIG. 4 and in other embodiment described herein.

Referring now to FIG. 4, a two-stage amplifier with two local bypass paths is shown. FIG. 4 is a circuit diagram illustrating an amplifier for RF signals with configurable local bypass paths according to some embodiments of the disclosure. A circuit 400 includes an antenna 402 coupled to an antenna interface 404. The antenna interface 404 may couple receiver circuitry to the antenna 402. The antenna interface 404 may also provide duplexing capability to allow transmit and receive circuitry to couple to the antenna 402, such as by providing an input 404A for receiving transmit signals from a power amplifier (PA) and an output 404B for transmitting receive signals to an amplifier. Transformer 420 receives signals from the first stage and outputs to transistors 420A, 420B configured as a second stage amplifier. A second transformer 430 separates the second amplifier stage from further circuitry in the receiver path, such as down-converters 330A-C.

A first configurable bypass path around the first stage amplifier transistors 410A-B is provided by switch 412. The switch 412 may create a first configurable bypass path to reduce the gain of the circuit 400 by passing the RF signals around the transistors 410A-B and thus reducing or eliminating the gain contributed by transistors 410A-B. A capacitive element, such as capacitor 416, may be coupled in series with the switch 412 to complete the bypass path around the transistors 410A-B, such that RF signals may be processed from the antenna interface 404 to the switch 412, and through the capacitor 416 to the first transformer 420. The first bypass path through the switch 412 may be configured by a first stage bypass signal, Byp_stg1, which may be generated by a controller based on a desired gain for the circuit 400. The transistor 412 may have a capacitor 432 and switch 434 coupled at the gate. Transistors 412 and 434 may operate as switches or common-gate amplifier depending on desired gain and linearity. In one configuration, transistor 412 may operate as a switch when the gate of the transistor 412 is floating with switch transistor 434 off. In another configuration, transistor 412 may operate as a common-gate amplifier by switching on transistor 414 to pass DC current from the supply and AC ground to the gate of transistor 412 by switching on transistor 434. In both configurations, the Byp_stg1 voltage at the gate of transistor 412 may be used to control the on-resistance (Ron) of the transistor 412 configured as a switch or the DC current of the transistor 412 configured as a common-gate amplifier.

A matching network including an antenna interface 404, a capacitor 436 and resistor 438 may be provided at an input to the first stage amplifier transistor 410B. This matching network may provide matching between the antenna 402 and the transistors 410A-B when the first stage amplifier is active. This matching network may also provide matching between the antenna interface 404 and the bypass path through switch 412 when the first stage amplifier is bypassed. The re-use of the matching network when the first stage amplifier is active and bypassed reduces additional components in the circuit 400, and thus reduces costs and size of the circuit 400.

A second configurable bypass path around the second stage amplifier transistors 420A-B is provided by switches 422. The switches 422 may activate the second configurable bypass path to reduce the gain of the circuit 400 by passing the RF signals around the transistors 420A-B and thus reducing or eliminating the gain contributed by transistors 420A-B. The second bypass path through the switches 422 may be configured by a second stage bypass signal, Byp_stg2, which may be generated by a controller based on a desired gain for the circuit 400.

When the bypass path is activated through switch 412, linearity degradation may be reduced through one or more techniques. For example, the gate and/or bulk of the switch 412 may be floated. As another example, the cascode gate capacitance 440 for transistor 410A may be a variable capacitance device, such as a varactor, and configured to a lower capacitance value when the bypass path is activated. As a further example, the gm gate of the first stage amplifier transistors 410A-B and/or the second stage amplifier transistors 420A-B may be provided a negative voltage to reduce degradation from nonlinear capacitances. As another example, the switches 422 off-capacitance may be used as neutralization capacitance and remove the neutralization capacitors 423A-B. In some embodiments, each of the switches 422 may be coupled from the gate of switch 420A to the drain of switch 420B and the other switch from the gate of switch 420B to the drain of switch 420A.

A common-gate configuration for the circuit 400 may be configured using a switch 414 coupled to the switch 412 and in parallel with capacitor 416. When activated, the switch 414 creates a path from the gate of the first stage amplifier transistor 410B, through the switch 412 and the switch 414, to the first transformer 420.

Different operating modes of the amplifier circuit of FIG. 4 are shown in FIG. 5, FIG. 6, and FIG. 7. Each of the operating modes may correspond to a different gain mode with different gain achieved at an output of the circuit 400 from the input received from antenna interface 404. FIG. 5 is a circuit illustrating operation of a two-stage amplifier in a first gain mode according to some embodiments of the disclosure. A first gain mode of the circuit 500 may bypass the first stage amplifier transistors 410A-B through bypass path 510 by activating the switch 412. The RF signal passes through the bypass path 510 to the first transformer 420 and through second stage amplifier transistors 420A-B. The RF signal is amplified by only the second stage amplifier and output to the second transformer 430.

FIG. 6 is a circuit illustrating operation of a two-stage amplifier in a second gain mode according to some embodiments of the disclosure. In the second gain mode of circuit 600, a common-gate configuration is applied to the first stage amplifier transistors 410A-B and a bypass path is activated around the second stage amplifier transistors 412A-B. In this gain mode, the RF signal passes from antenna interface 404 to bypass path 510, through first transformer 420, through bypass path 710, to second transformer 430.

FIG. 7 is a circuit illustrating operation of a two-stage amplifier in a third gain mode according to some embodiments of the disclosure. In the third gain mode of circuit 700, the first and second amplifier stages are bypassed to reduce gain of circuit 700 to a lowest setting. The RF signal passes through the bypass path 510 to the first transformer 420 and through bypass path 710 to the second transformer 430.

Although a two-stage amplifier is shown in FIG. 4, FIG. 5, FIG. 6, and FIG. 7, other amplifier configurations may include more stages, some or all of which may include local configurable bypass paths. For example, an amplifier may include three stages, with configurable bypass paths around two of the three stages. As another example, an amplifier may include four stages, with configurable bypass paths around all four of the stages. Further configurations according to some embodiments may also include a configuration in which the first stage is configured for common gate operation and the second stage has bypass paths disabled.

A method of operating a multiple stage amplifier, such as the two-stage amplifiers of FIG. 4, is shown in FIG. 8. FIG. 8 is a flow chart illustrating a method of operating an amplifier in a receiver circuit according to some embodiments of the disclosure. A method 800 includes, at block 802, determining a radio frequency (RF) amplifier gain setting. For example, the determination of block 902 may select one of gain modes G1, G2, G3, G4, G5, and G6. The determination of one of available gain modes may be made based on measurements of the RF signal at the antenna, at the RFFE, at the input of the amplifier, or at the output of the amplifier. The determination of one of the available gain modes may also be based on a band contained in the RF signal, a configuration of the receiver received from a base station, and/or a carrier aggregation (CA) configuration.

At block 804, the RF receive chain is configured for the RF amplifier gain setting determined at block 802 by adjusting one or more configurable local bypass paths in the RF amplifier. A determination of gain mode G4 at block 802 may result in outputting appropriate control signals, such as Byp_stg1, Byp_stg2, and CG_SW signals, to configure circuit 400 of FIG. 4 as shown in FIG. 5. For example, the Byp_stg2 signal may be raised high while the Byp_stg1 and CG_SW signals are held low. The Byp_stg2 control signal signals the activation of the second stage bypass to substantially remove or completely remove one or more of the gain transistors in the second amplifier stage from processing of mmWave RF signals in the LNA. A determination of gain mode G5 at block 802 may result in outputting appropriate control signals, such as Byp_stg1, Byp_stg2, and CG_SW signals, to configure circuit 400 of FIG. 4 as shown in FIG. 6. For example, the CG_SW and Byp_stg1 signals may be raised high while the Byp_stg2 signal is held low. The Byp_stg1 control signal signals the activation of the first stage bypass to substantially remove or completely remove one or more of the gain transistors in the first amplifier stage from processing of mmWave RF signals in the LNA. The CG_SW signal signals the activation of the common gate transistor to short out a capacitive element or other element such that one or more gates of one or more first stage gain transistors is coupled to an output of the first stage amplifier. The common-gate configuration in the G6 mode may improve signal processing, such as by increasing a noise figure for the LNA. A determination of gain mode G6 at block 902 may result in outputting appropriate control signals, such as Byp_stg1, Byp_stg2, and CG_SW signals, to configure circuit 400 of FIG. 4 as shown in FIG. 7. For example, the Byp_stg1 signal may be raised high while the Byp_stg2 and CG_SW signals are held low. The Byp_stg1 control signal signals the activation of the first stage bypass to substantially remove or completely remove one or more of the gain transistors in the first amplifier stage from processing of mmWave RF signals in the LNA.

Figure 9:
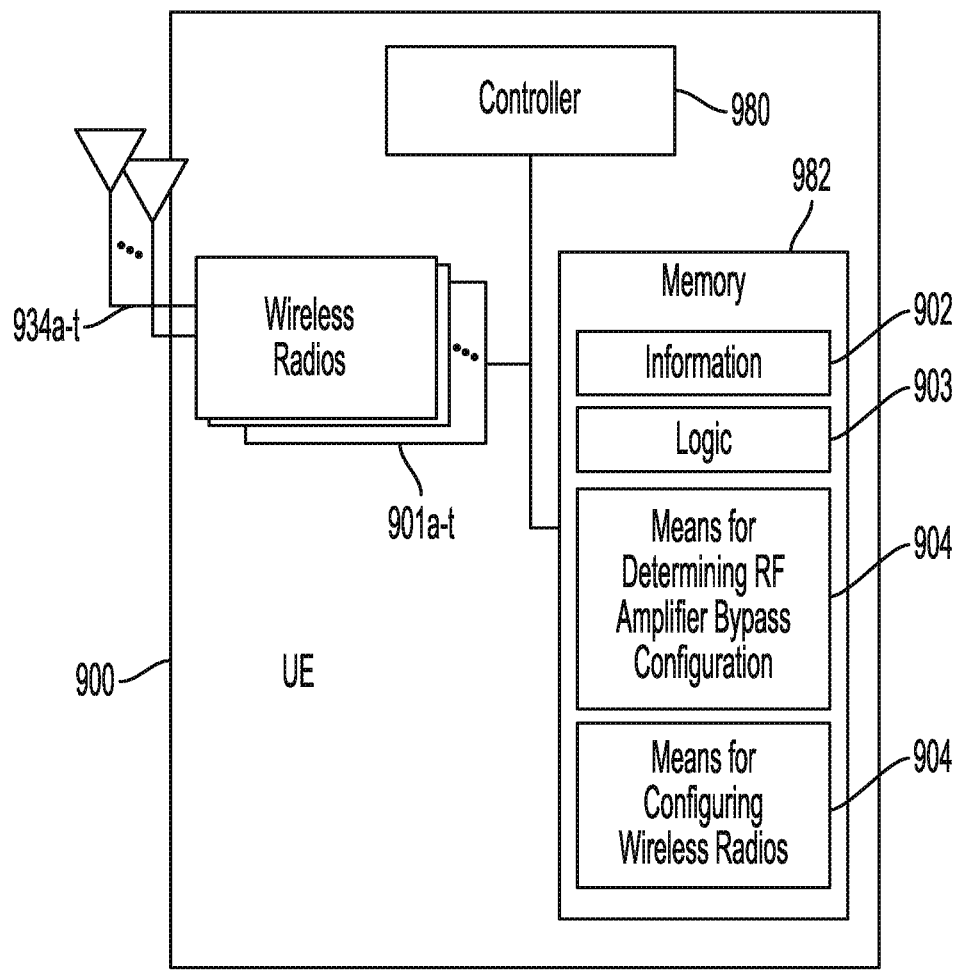
FIG. 9 is a block diagram of an example UE that supports RF amplifier bypass configuration according to one or more aspects.

FIG. 9 is a block diagram of an example UE 900 that supports configuring bypass paths in a mmWave RF amplifier according to one or more aspects. UE 900 may be configured to perform operations, including the blocks of process 800 described with reference to FIG. 8. In some implementations, UE 900 includes the structure, hardware, and components shown and described with reference to UE 115 of FIGS. 1-2. For example, UE 900 may include controller 980, which operates to execute logic or computer instructions stored in memory 982, as well as controlling the components of UE 900 that provide the features and functionality of UE 900. UE 900, under control of controller 980, transmits and receives signals via wireless radios 901a-t and antennas 934a-t. Wireless radios 901a-t include various components and hardware, as illustrated in FIG. 2 for UE 115, including modulator and demodulators 254a-t, transmit processor 258, TX MIMO processor 266, MIMO detector 256, and receive processor 258.

As shown, the memory 982 may include information 902, logic 903, and means for determining an RF amplifier bypass configuration 904 and means for configuring wireless radios 904. The wireless radios 901a-t may include one or more aspects of the amplifier circuits described with reference to FIG. 2, FIG. 3A, FIG. 3B, FIG. 4, FIG. 5, FIG. 6, FIG. 7, and FIG. 8. UE 900 may receive signals from or transmit signals to one or more BSs, such as BS 105 of FIGS. 1-2.

Figure 10:
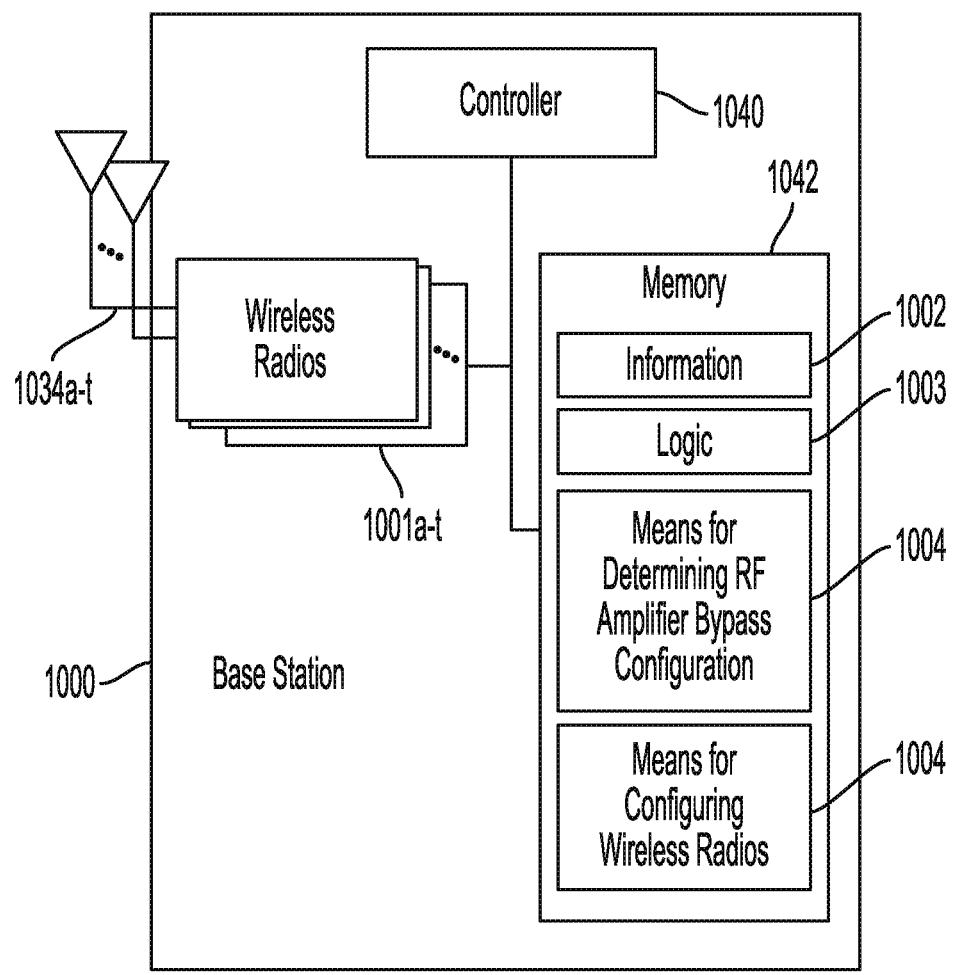
FIG. 10 is a block diagram of an example base station that supports RF amplifier bypass configuration according to one or more aspects.

FIG. 10 is a block diagram of an example base station (BS) 1000 that supports configuring bypass paths in a mmWave RF amplifier according to one or more aspects. BS 1000 may be configured to perform operations, including the blocks of process 800 described with reference to FIG. 8. In some implementations, base station 1000 includes the structure, hardware, and components shown and described with reference to BS 105 of FIGS. 1-2. For example, BS 1000 may include controller 1040, which operates to execute logic or computer instructions stored in memory 1042, as well as controlling the components of BS 1000 that provide the features and functionality of BS 1000. BS 1000, under control of controller 1140, transmits and receives signals via wireless radios 1001a-t and antennas 134a-t. Wireless radios 1001a-t include various components and hardware, as illustrated in FIG. 2 for BS 105, including modulator and demodulators 232a-t, transmit processor 220, TX MIMO processor 230, MIMO detector 236, and receive processor 238.

As shown, the memory 1042 may include information 1002, logic 1003, and means for determining an RF amplifier bypass configuration 1004 and means for configuring wireless radios 1004. The wireless radios 1001a-r may include one or more aspects of the amplifier circuits described with reference to FIG. 2, FIG. 3A, FIG. 3B, FIG. 4, FIG. 5, FIG. 6, and FIG. 7. BS 1000 may receive signals from or transmit signals to one or more UEs, such as UEs 115 of FIGS. 1-2.

It is noted that one or more blocks (or operations) described with reference to FIG. 8 may be combined with one or more blocks (or operations) described with reference to another of the figures. For example, one or more blocks (or operations) of FIG. 8 may be combined with one or more blocks (or operations) of FIG. 4. As another example, one or more blocks associated with FIG. 8 may be combined with one or more blocks associated with FIG. 2. Additionally, or alternatively, one or more operations described above with reference to FIG. 1 and FIG. 2 may be combined with one or more operations described with reference to FIG. 9 and FIG. 10.

In one or more aspects, techniques for supporting wireless operations may include additional aspects, such as any single aspect or any combination of aspects described below or in connection with one or more other processes or devices described elsewhere herein. In a first aspect, supporting wireless communications may include an apparatus configured to perform operations including determining a radio frequency (RF) amplifier gain setting and configuring a radio frequency (RF) amplifier based on the radio frequency (RF) amplifier gain setting. The apparatus is further configured to configure the RF amplifier by performing operations of controlling a configurable first stage bypass of a first stage amplifier of the radio frequency (RF) amplifier; and controlling a configurable second stage bypass of a second stage amplifier of the radio frequency (RF) amplifier. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, in combination with the first aspect, controlling a configurable first stage bypass comprises controlling a configurable first stage bypass local to the first stage amplifier within the radio frequency (RF) amplifier.

In a third aspect, in combination with one or more of the first aspect or the second aspect, configuring a radio frequency (RF) amplifier based on the radio frequency (RF) amplifier gain setting further comprises performing operations of: controlling a transistor configured to provide a DC current to the configurable first stage bypass of a first stage amplifier of the radio frequency (RF) amplifier.

In a fourth aspect, in combination with one or more of the first aspect through the third aspect, controlling a configurable first stage bypass comprises configuring a bypass path through a first bypass switch and a capacitor in series with the transistor.

In a fifth aspect, in combination with one or more of the first aspect through the fourth aspect, configuring a radio frequency (RF) amplifier based on the radio frequency (RF) amplifier gain setting comprises: configuring, based on determining to operate in a first gain mode, the configurable first stage bypass to bypass the first stage amplifier; configuring, based on determining to operate in a second gain mode, the configurable second stage bypass to bypass the second stage amplifier and configuring the transistor to provide a DC current and an AC ground to the configurable first stage bypass; and configuring, based on determining to operate in a third gain mode, the configurable first stage bypass to bypass the first stage amplifier, and configuring the configurable second stage bypass to bypass the second stage amplifier.

In a sixth aspect, in combination with one or more of the first aspect through the fifth aspect, the first gain mode has a higher gain than the second gain mode, and wherein the second gain mode has a higher gain than the third gain mode.

In a seventh aspect, in combination with one or more of the first aspect through the sixth aspect, the apparatus is further configured to perform operations including matching an input to transistors of the first stage amplifier with a matching network; and matching an input to the configurable first stage bypass of the first stage amplifier with the matching network.

In an eighth aspect, in combination with one or more of the first aspect through the seventh aspect, configuring a radio frequency (RF) amplifier comprises: coupling an input to the radio frequency (RF) amplifier to a first stage transformer through transistors of the first stage amplifier or through the configurable first stage bypass of the first stage amplifier; and coupling an output of the first stage transformer to a second stage transformer through transistors of the second stage amplifier or through the configurable second stage bypass of the second stage amplifier.

In a ninth aspect, in combination with one or more of the first aspect through the eighth aspect, the apparatus is further configured to perform operations including amplifying millimeter wave (mmWave) radio frequency (RF) signals with the radio frequency (RF) amplifier after configuring the radio frequency (RF) amplifier based on the radio frequency (RF) amplifier gain setting to generate amplified mmWave RF signals.

In a tenth aspect, in combination with one or more of the first aspect through the ninth aspect, the apparatus is further configured to perform operations including receiving mmWave RF signals from an antenna; downconverting the amplified mmWave RF signals to mmWave IF signals; and amplifying the mmWave IF signals with the RF amplifier according to the RF amplifier gain setting.

In an eleventh aspect, in combination with one or more of the first aspect through the tenth aspect, the apparatus is further configured to perform operations including phase-shifting the amplified mmWave RF signals.

In one or more aspects, techniques for supporting wireless operations may include additional aspects, such as any single aspect or any combination of aspects described below or in connection with one or more other processes or devices described elsewhere herein. In a twelfth aspect, supporting wireless communications may include an apparatus comprising an amplifier with a first stage amplifier; a second stage amplifier; a configurable first stage bypass coupled between a first input and a first output of the first stage amplifier; and a configurable second stage bypass coupled between a second input and a second output of the second stage amplifier. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In a thirteenth aspect, in combination with one or more of the first aspect through the twelfth aspect, the configurable first stage bypass is local to the amplifier.

In a fourteenth aspect, in combination with one or more of the first aspect through the thirteenth aspect, the apparatus may further include transistor coupled to a gate of the first stage amplifier and configured to provide a DC current to a common-gate transistor of the configurable first stage bypass.

In a fifteenth aspect, in combination with one or more of the first aspect through the fourteenth aspect, the apparatus may include a capacitor in parallel with the transistor.

In a sixteenth aspect, in combination with one or more of the first aspect through the fifteenth aspect, the apparatus may include a controller coupled to the configurable first stage bypass and coupled to the configurable second stage bypass and coupled to the transistor, wherein the controller is configured to perform operations comprising: configuring, based on determining to operate in a first gain mode, the configurable first stage bypass to bypass the first stage amplifier; configuring, based on determining to operate in a second gain mode, the configurable second stage bypass to bypass the second stage amplifier and configuring the transistor to provide a DC current and an AC ground to the configurable first stage bypass; and configuring, based on determining to operate in a third gain mode, the configurable first stage bypass to bypass the first stage amplifier, and configuring the configurable second stage bypass to bypass the second stage amplifier.

In a seventeenth aspect, in combination with one or more of the first aspect through the sixteenth aspect, the first gain mode has a higher gain than the second gain mode, and wherein the second gain mode has a higher gain than the third gain mode.

In an eighteenth aspect, in combination with one or more of the first aspect through the seventeenth aspect, the apparatus may include a matching network coupled to the first stage amplifier, wherein the matching network is configured to provide matching when the configurable first stage bypass is configured to bypass the first stage amplifier.

In a nineteenth aspect, in combination with one or more of the first aspect through the eighteenth aspect, the apparatus may include a first stage transformer coupled between the first output of the first stage amplifier and the second input of the second stage amplifier; and a second stage transformer coupled to the second output of the second stage amplifier, wherein: the configurable first stage bypass creates a first bypass path around the first stage amplifier with endpoints on a same side of the first stage transformer; and the configurable second stage bypass creates a second bypass path around the second stage amplifier with endpoints on a same side of the second stage transformer.

In a twentieth aspect, in combination with one or more of the first aspect through the nineteenth aspect, the amplifier is configured to amplify millimeter wave (mmWave) radio frequency (RF) signals.

In a twenty-first aspect, in combination with one or more of the first aspect through the twentieth aspect, the apparatus may include an antenna port coupled to the amplifier, wherein the amplifier is configured to receive mmWave RF signals from an antenna coupled to the antenna port and configured to generate amplified mmWave RF signals; and a downconverter coupled to the amplifier and configured to downconvert the amplified mmWave RF signals to mmWave IF signals.

In a twenty-second aspect, in combination with one or more of the first aspect through the twenty-first aspect, the apparatus may include an antenna port coupled to a downconverter, which downconverts received mmWave RF signals to mmWave IF signals, in which the amplifier comprises an input port coupled to the downconverter to receive the mmWave IF signals to amplify the mmWave IF signals.

In a twenty-third aspect, in combination with one or more of the first aspect through the twenty-second aspect, the apparatus may include a phase-shifter coupled to the amplifier and configured to adjust a signal phase of the amplified mmWave RF signals.

In a twenty-fourth aspect, in combination with one or more of the first aspect through the twenty-third aspect, an apparatus may include a radio frequency (RF) low noise amplifier (LNA) comprising an amplifier input and an amplifier output, the LNA including one or more of a first gain transistor comprising a first input and a first output, wherein the first input is coupled to the amplifier input; a first bypass transistor comprising a second input and a second output, wherein the second input is coupled to the amplifier input and the second output is coupled to the first output; a second gain transistor comprising a third input and a third output, wherein the third input is coupled to the second output and the third output is coupled to the amplifier output; or a second bypass transistor comprising a fourth input and a fourth output, wherein the fourth input is coupled to the third input and the fourth output is coupled to the amplifier output.

In a twenty-fifth aspect, in combination with one or more of the first aspect through the twenty-fourth aspect, the apparatus may include a common gate transistor comprising a fifth input and a fifth output, wherein the fifth input is coupled to the second output and the fifth output is coupled to the first output; and a capacitive element coupled between the fifth input and the fifth output.

In a twenty-sixth aspect, combination with one or more of the first aspect through the twenty-fifth aspect, the apparatus may include a controller coupled to a first gate of the first bypass transistor and coupled to a second gate of the second bypass transistor and coupled to a third gate of the common gate transistor, wherein the controller is configured to perform operations comprising one or more of: configuring, based on determining to operate in a first gain mode for processing millimeter wave (mmWave) radio frequency (RF) signals, the first bypass transistor to bypass the first gain transistor; configuring, based on determining to operate in a second gain mode for processing millimeter wave (mmWave) radio frequency (RF) signals, the second bypass transistor to bypass the second gain transistor and configuring the common gate transistor to provide a DC current to the first gain transistor; or configuring, based on determining to operate in a third gain mode for processing millimeter wave (mmWave) radio frequency (RF) signals, the first bypass transistor to bypass the first gain transistor and configuring second bypass transistor to bypass the second gain transistor.

In one or more aspects, techniques for supporting wireless operations in a base station may include additional aspects, such as any single aspect or any combination of aspects described above or in connection with one or more other processes or devices described elsewhere herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-10 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus, comprising:
   an amplifier, comprising:
      a first stage amplifier;
      a second stage amplifier;
      a configurable first stage bypass coupled between a first input and a first output of the first stage amplifier;
      a configurable second stage bypass coupled between a second input and a second output of the second stage amplifier; and
      a transistor coupled to a gate of the first stage amplifier and configured to provide a DC current to a common-gate transistor of the configurable first stage bypass.

2. The apparatus of claim 1, wherein the configurable first stage bypass is local to the amplifier.

3. The apparatus of claim 1, further comprising a capacitor in parallel with the transistor.

4. The apparatus of claim 1, further comprising:
   a controller coupled to the configurable first stage bypass and coupled to the configurable second stage bypass and coupled to the transistor, wherein the controller is configured to perform operations comprising:
      configuring, based on determining to operate in a first gain mode, the configurable first stage bypass to bypass the first stage amplifier;
      configuring, based on determining to operate in a second gain mode, the configurable second stage bypass to bypass the second stage amplifier and configuring the transistor to provide the DC current and an AC ground to the configurable first stage bypass; and
      configuring, based on determining to operate in a third gain mode, the configurable first stage bypass to bypass the first stage amplifier, and configuring the configurable second stage bypass to bypass the second stage amplifier.

5. The apparatus of claim 4, wherein the first gain mode has a higher gain than the second gain mode, and wherein the second gain mode has a higher gain than the third gain mode.

6. The apparatus of claim 1, further comprising a matching network coupled to the first stage amplifier, wherein the matching network is configured to provide matching when the configurable first stage bypass is configured to bypass the first stage amplifier.

7. The apparatus of claim 1, further comprising:
   a first stage transformer coupled between the first output of the first stage amplifier and the second input of the second stage amplifier; and
   a second stage transformer coupled to the second output of the second stage amplifier,
   wherein:
      the configurable first stage bypass creates a first bypass path around the first stage amplifier with endpoints on a same side of the first stage transformer; and
      the configurable second stage bypass creates a second bypass path around the second stage amplifier with endpoints on a same side of the second stage transformer.

8. The apparatus of claim 1, wherein the amplifier is configured to amplify millimeter wave (mmWave) radio frequency (RF) signals.

9. The apparatus of claim 8, further comprising:
   an antenna port coupled to the amplifier, wherein the amplifier is configured to receive mmWave RF signals from an antenna coupled to the antenna port and configured to generate amplified mmWave RF signals; and
   a downconverter coupled to the amplifier and configured to downconvert the amplified mmWave RF signals to mmWave IF signals.

10. The apparatus of claim 9, further comprising a phase-shifter coupled to the amplifier and configured to adjust a signal phase of the amplified mm Wave RF signals.

11. A method of wireless communication, the method comprising:
    determining a radio frequency (RF) amplifier gain setting; and
    configuring a radio frequency (RF) amplifier based on the radio frequency (RF) amplifier gain setting by performing operations of:
       controlling a configurable first stage bypass of a first stage amplifier of the radio frequency (RF) amplifier; and
       controlling a configurable second stage bypass of a second stage amplifier of the radio frequency (RF) amplifier, wherein configuring the radio frequency (RF) amplifier comprises:
          coupling an input to the radio frequency (RF) amplifier to a first stage transformer through transistors of the first stage amplifier or through the configurable first stage bypass of the first stage amplifier; and
          coupling an output of the first stage transformer to a second stage transformer through transistors of the second stage amplifier or through the configurable second stage bypass of the second stage amplifier.

12. The method of claim 11, wherein controlling a configurable first stage bypass comprises controlling a configurable first stage bypass local to the first stage amplifier within the radio frequency (RF) amplifier.

13. The method of claim 11, wherein configuring a radio frequency (RF) amplifier based on the radio frequency (RF) amplifier gain setting further comprises performing operations of:
controlling a transistor configured to provide a DC current to the configurable first stage bypass of a first stage amplifier of the radio frequency (RF) amplifier.

14. The method of claim 13, wherein controlling a configurable first stage bypass comprises configuring a bypass path through a first bypass switch and a capacitor in series with the transistor.

15. The method of claim 13, wherein configuring a radio frequency (RF) amplifier based on the radio frequency (RF) amplifier gain setting comprises:
configuring, based on determining to operate in a first gain mode, the configurable first stage bypass to bypass the first stage amplifier;
configuring, based on determining to operate in a second gain mode, the configurable second stage bypass to bypass the second stage amplifier and configuring the transistor to provide the DC current and an AC ground to the configurable first stage bypass; and
configuring, based on determining to operate in a third gain mode, the configurable first stage bypass to bypass the first stage amplifier, and configuring the configurable second stage bypass to bypass the second stage amplifier.

16. The method of claim 15, wherein the first gain mode has a higher gain than the second gain mode, and wherein the second gain mode has a higher gain than the third gain mode.

17. The method of claim 11, further comprising:
matching an input to the transistors of the first stage amplifier with a matching network; and
matching an input to the configurable first stage bypass of the first stage amplifier with the matching network.

18. The method of claim 11, further comprising amplifying millimeter wave (mmWave) radio frequency (RF) signals with the radio frequency (RF) amplifier after configuring the radio frequency (RF) amplifier based on the radio frequency (RF) amplifier gain setting to generate amplified mmWave RF signals.

19. The method of claim 11, further comprising:
receiving mmWave RF signals from an antenna;
amplifying the mmWave RF signals with the RF amplifier according to the RF amplifier gain setting to generate amplified mmWave RF signals; and
downconverting the amplified mmWave RF signals to mmWave IF signals.

20. The method of claim 19, further comprising:
phase-shifting the amplified mmWave RF signals before downconverting the amplified mmWave RF signals.

21. An apparatus, comprising:
a wireless radio, the wireless radio comprising a radio frequency (RF) amplifier, the RF amplifier comprising:
a first stage amplifier;
a second stage amplifier;
a configurable first stage bypass coupled between a first input and a first output of the first stage amplifier;
a configurable second stage bypass coupled between a second input and a second output of the second stage amplifier; and
a transistor coupled to a gate of the first stage amplifier and configured to provide a DC current to a common-gate transistor of the configurable first stage bypass;
at least one processor coupled to the wireless radio; and
a memory coupled to the at least one processor,
wherein the at least one processor is configured to perform operations comprising:
determining a RF amplifier gain setting; and
configuring the RF amplifier based on the RF amplifier gain setting by performing operations of:
controlling the configurable first stage bypass of the RF amplifier; and
controlling the configurable second stage bypass of the RF amplifier.

22. The apparatus of claim 21, wherein the RF amplifier further comprises a capacitor in parallel with the transistor.

23. The apparatus of claim 21, wherein the at least one processor is configured to perform further operations comprising:
configuring, based on determining to operate in a first gain mode, the configurable first stage bypass to bypass the first stage amplifier;
configuring, based on determining to operate in a second gain mode, the configurable second stage bypass to bypass the second stage amplifier and configuring the transistor to provide the DC current to the first stage amplifier; and
configuring, based on determining to operate in a third gain mode, the configurable first stage bypass to bypass the first stage amplifier, configuring the configurable second stage bypass to bypass the second stage amplifier, and configuring the transistor to be off.

24. The apparatus of claim 23, wherein the first gain mode has a higher gain than the second gain mode, and wherein the second gain mode has a higher gain than the third gain mode.

25. An apparatus, comprising:
an amplifier, comprising:
a first stage amplifier;
a second stage amplifier;
a configurable first stage bypass coupled between a first input and a first output of the first stage amplifier; and
a configurable second stage bypass coupled between a second input and a second output of the second stage amplifier;
a first stage transformer coupled between the first output of the first stage amplifier and the second input of the second stage amplifier; and
a second stage transformer coupled to the second output of the second stage amplifier,
wherein:
the configurable first stage bypass creates a first bypass path around the first stage amplifier with endpoints on a same side of the first stage transformer; and
the configurable second stage bypass creates a second bypass path around the second stage amplifier with endpoints on a same side of the second stage transformer.

26. The apparatus of claim 3, further comprising the common-gate transistor having a first terminal coupled to the transistor and a second terminal coupled to the gate of the first stage amplifier.

27. The apparatus of claim 26, further comprising a second capacitor and a switch coupled between a gate of the common-gate transistor and ground.

* * * * *